United States Patent [19]

Beres et al.

[11] Patent Number: 4,508,497

[45] Date of Patent: Apr. 2, 1985

[54] CABLE TAKE-UP FOR TIRE VULCANIZER

[75] Inventors: Arthur W. Beres, Springfield Township, Summit County; Joseph P. Verderico, Akron, both of Ohio

[73] Assignee: The Goodyear Tire & Rubber Company, Akron, Ohio

[21] Appl. No.: 543,875

[22] Filed: Oct. 20, 1983

[51] Int. Cl.³ .............................................. B29H 5/02
[52] U.S. Cl. ................................. 425/28 R; 425/29; 74/501.5 R
[58] Field of Search .............. 425/28 R, 29; 264/40.1, 264/40.6, 315, 326; 74/501.5 R

[56] References Cited

U.S. PATENT DOCUMENTS

| | | | |
|---|---|---|---|
| 3,290,959 | 12/1966 | Hicks et al. | 74/501.5 R |
| 4,115,046 | 9/1978 | Smith et al. | 425/29 |
| 4,143,114 | 3/1979 | Smith et al. | 264/40.6 |

FOREIGN PATENT DOCUMENTS

| | | | |
|---|---|---|---|
| 569233 | 11/1957 | Italy | 242/147 R |
| 57-142340 | 9/1982 | Japan | 425/29 |

Primary Examiner—J. Howard Flint, Jr.
Attorney, Agent, or Firm—Frederick K. Lacher; T. P. Lewandowski

[57] ABSTRACT

A pair of arms having cable guides are connected for movement together and apart and include a torsion spring for urging the arms apart to maintain tension in a flexible cable carried by the cable guides. The cable is connected to a radially and axially movable segment of a segmental mold. The cable extends from the movable segment into a steam chamber and then through the cover of an opening in the wall of the steam chamber. At least one of the arms is mounted for hinged movement relative to the other arm on the cover so that the arms in a retracted position can be moved through the opening when the cover is removed.

13 Claims, 2 Drawing Figures

CABLE TAKE-UP FOR TIRE VULCANIZER

This invention relates generally to a take-up apparatus for maintaining tension in an elongated flexible cable member which is connected to a movable part and especially to a flexible cable member connected to a segment of a segmental tire mold.

Heretofore the cable connected to a segment of the segmental mold was provided with a loop in an upper section of the tire press which would provide an extra length of cable to compensate for movement of the segment during opening of the tire press. No provision was made for holding the cable in a continuous taut condition and, as a result, the cable was subject to pinching and damage during use. The segmental mold is usually mounted on a steam dome press and the cable connected to a segment of the mold is preferably located within the heat shield around the press and extends through the steam chamber within the steam dome and then passes through a hand hole to a tire press control mechanism. A temperature sensing probe is mounted in the segment of the segmental mold and sensing wires are carried by the cable to the tire press control mechanism which is actuated in response to the temperature changes of the rubber in the tire being cured.

The present invention is directed to a take-up apparatus which can be positioned in the space within the steam dome of a tire press an can be installed and removed through a hand hole in the dome. This may be done without leakage of steam at the hand hole cover and with ready access to the apparatus of the invention.

In accordance with an aspect of the invention there is provided a take-up apparatus for maintaining tension in an elongated flexible cable member in a space on one side of a wall having an opening for the cable member comprising a supporting member, a support arm mounted on the supporting member, the support arm including a support arm guide for guiding the cable member, a pivot arm mounted on the supporting member for swinging movement between a retracted position adjacent the support arm and an extended position spaced from the support arm, the pivot arm including a pivot arm guide for guiding the cable member, and means for urging the pivot arm away from the retracted position toward the extended position to maintain tension in the cable member.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
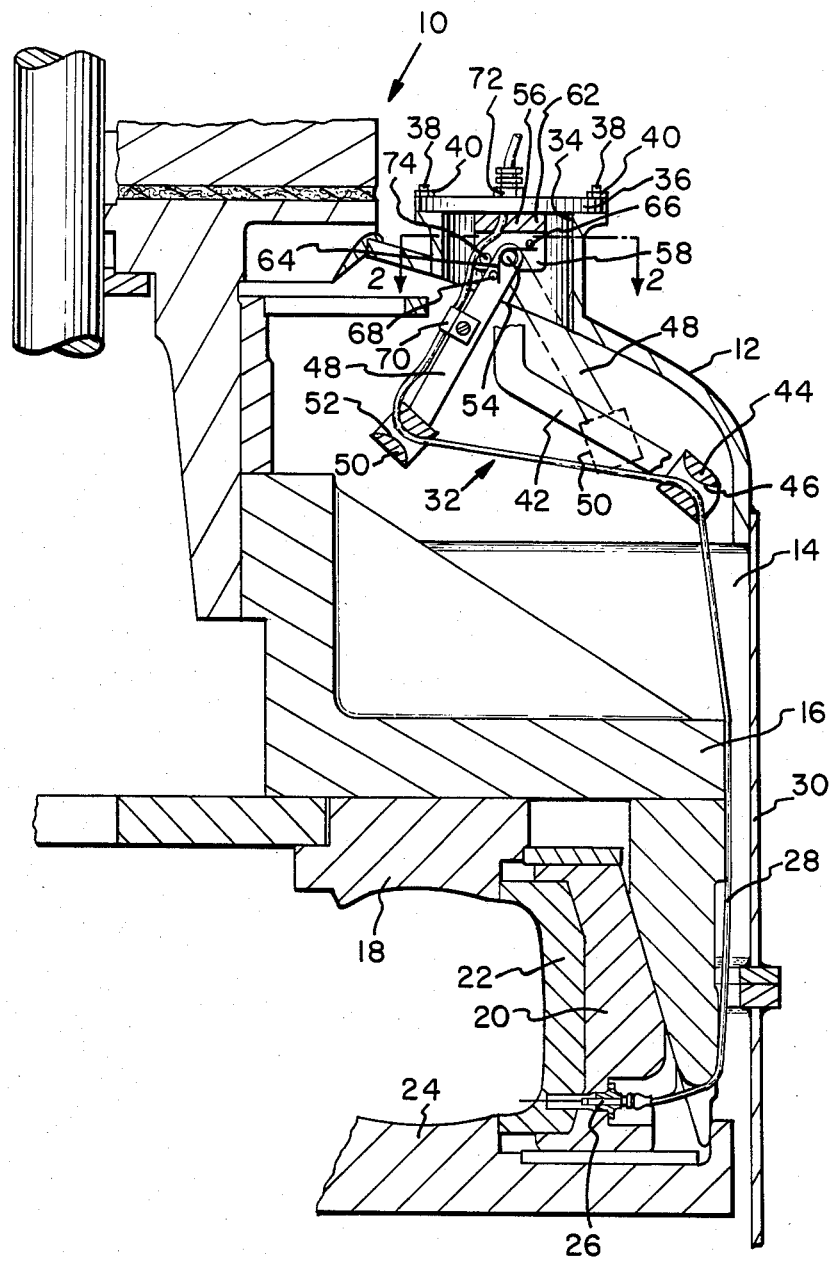
FIG. 1 is a fragmentary cross-sectional, partially schematic view taken along a radial plane of a steam dome tire press showing the segmental mold in the closed position and the take-up apparatus in the extended position. The position of the pivot arm in the retracted condition is also shown in phantom lines.
Figure 2:
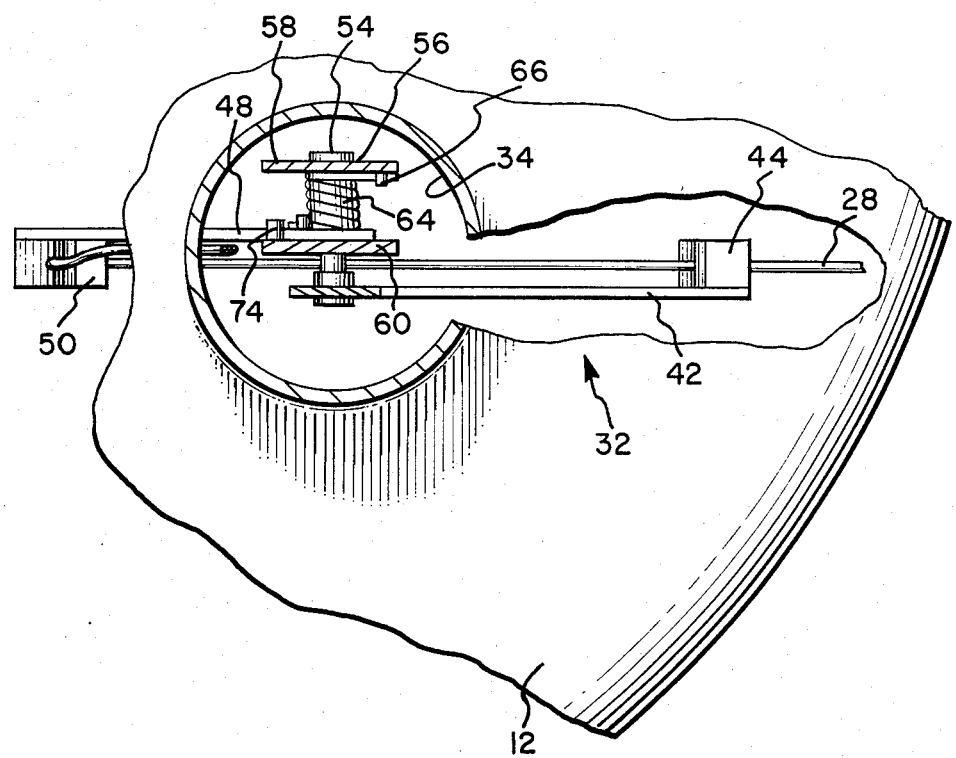
FIG. 2 is a fragmentary sectional view taken along the line 2—2 of FIG. 1 with parts being broken away.

Referring to FIG. 1, a tire press 10 is shown which is of the steam dome type having a wall 12 enclosing a steam chamber 14 for heating a platen 16 supporting an upper mold section 18 of a segmental mold 20. Movable segments 22 of the segmental mold 20 are also carried by the upper platen 16 and are moved radially and vertically during opening and closing of the tire press 10. The segmental mold 20 also has a lower mold section 24 which is engageable with the segments 22 upon closing of the tire press 10. A probe 26 may be mounted in one of the segments 22 for measuring the temperature of the tire during vulcanization. The probe 26 is connected to sensor wires (not shown) which are carried to a cure rate integrator or other suitable press control apparatus (not shown) by a tubular elongated flexible cable member such as cable 28 which extends between the segmental mold 20 and a heat shield 30 through the steam chamber 14 to the press control apparatus.

A take-up apparatus 32 is located in the steam chamber 14 for supporting and maintaining tension in the cable 28 during opening and closing of the tire press 10. The cable 28 extends through an opening such as hand hole 34 in the wall 12 of the dome. A supporting member such as hand hole cover 36 is mounted on the wall 12 to cover and seal the hand hole 34. Studs 38 on the wall 12 at the hand hole 34 extend upwardly through holes in the hand hole cover 36 and nuts 40 are threaded on the studs for clamping the hand hole cover in sealing engagement with the hand hole.

A support arm 42 is mounted on the hand hole cover 36 as by welding and extends through the hand hole 34 into the steam chamber 14 to a cable guide such as support arm head 44. The cable 28 may be pressed through an opening 46 in the head 44. Preferably the support arm head 44 is located adjacent the wall 12 of the dome and the support arm 42 may be bent or curved to provide the desired location of the support arm head.

A pivot arm 48 is mounted on the hand hole cover 36 for swinging movement between a retracted position adjacent the support arm 42, shown in phantom lines in FIG. 1, and an extended position spaced from the support arm, shown in full lines. The pivot arm 48 includes a pivot arm guide such as pivot arm head 50 having an opening 52 through which the cable 28 may be passed. The pivot arm head 50 may be tilted relative to the pivot arm 48 and the support arm head 44 may be tilted relative to the support arm 42 to reduce the wear on the cable 28 and accommodate relatively large diameter cables.

The pivot arm 48 is mounted for pivotal movement on a clevis pin 54 of a fork type clevis 56 having legs 58 and 60 mounted on a base 62 which is fastened to the hand hole cover 36 by suitable means such as welding. Spring means such as a torsion spring 64 may be wound around the clevis pin 54 and engage pins 66 and 68 on the leg 58 and pivot arm 48, respectively, for urging the pivot arm away from the retracted position toward the extended position to maintain tension in the cable 28.

As shown in FIG. 1, the cable 28 may be fastened to the pivot arm 48 by a clamp 70 and to the hand hole cover 36 by a cable sealing gland 72. Accordingly, adjustment of the length of the cable 28 between the hand hole cover 36 and the probe 26 in the segmental mold 20 is provided by releasing the cable from the clamp 70 and cable sealing gland 72 and then clamping the cable after the desired length is fed through the hand hole cover.

As shown in FIG. 1, the pivot arm 48 is movable from the retracted position shown in phantom lines to the extended position shown in full lines. A stop member such as stop pin 74 may be mounted on the leg 58 of the clevis 56 for limiting the swinging movement of the pivot arm 48 away from the support arm 42 to determine the extended position of the pivot arm.

During installation, the probe 26 is disconnected from the segment 22 and the hand hole cover 36 is removed from the hand hole 34 by removing the nuts 40 from the studs 38. The hand hole cover 36 is then pulled away from the hand hole 34 and the pivot arm 48 is urged toward the support arm 42 by the sides of the hand hole into the retracted position so that the pivot arm and support arm have a maximum cross-sectional size less than the size of the hand hole and can be removed from the steam chamber 14. In a like manner, to install the take-up apparatus 32, the pivot arm 48 is moved into close proximity to the support arm 42 in the retracted position and then pushed through the hand hole 34 into the steam chamber 14. The hand hole cover 36 is mounted on the hand hole 34 by threading the nuts 40 over the studs 38 to provide the sealing engagement between the hand hole cover and the hand hole.

During operation the segments 22 of the segmental mold 20 move radially outward and axially downward from the position shown in FIG. 1 during opening of the tire press 10. The axial movement is greater than the radial movement and therefore a length of cable 28 is pulled out of the steam chamber 14. The cable 28 is held taut at a predetermined tension during this opening movement by the pivot arm 48 which is movable against the force of the torsion spring 64 from the extended position shown in solid lines in FIG. 1 to the retracted position shown in phantom lines in FIG. 1. Upon closing of the tire press 10 the segments 22 of the segmental mold 20 are moved radially inward and axially upward. The radial movement is less than the axial movement and therefore a length of the cable 28 must be pulled into the steam chamber 14 to maintain the cable in a taut condition. The torsion spring 64 rotates the pivot arm 48 from the retracted position to the extended position to take up slack in the cable 28 and maintain tension in the cable.

With the take-up apparatus 32 of this invention, the cable 28 is maintained in a taut condition at all times and the danger of pinching the cable causing damage to the cable and sensor wires is substantially reduced. The cable 28 is maintained in a position between the heat shield 30 and the platen 16 which may be moved or rotated without interference with the take-up apparatus 32. The opening 46 in the support arm head 44 and the opening 52 in the pivot arm head 50 may be of sufficient size so that the probe 26 may be threaded through the openings if desired. Tilting of the support arm head 44 and pivot arm head 50 may be provided to accommodate relatively large diameter cables 28 and reduce wear. Access to the take-up apparatus 32 is provided even though during operation the apparatus is sealed inside the steam chamber 14 of the tire press 10.

While a certain representative embodiment and details have been shown for the purpose of illustrating the invention, it will be apparent to those skilled in the art that various changes and modifications may be made therein without departing from the spirit or scope of the invention.

What is claimed is:

1. A take-up apparatus for maintaining tension in an elongated flexible cable member in a space on one side of a wall having an opening for said cable member comprising a supporting member, a support arm mounted on said supporting member, said support arm including a support arm guide for guiding said cable member, a pivot arm mounted on said supporting member for swinging movement between a retracted position adjacent said support arm and an extended position spaced from said support arm, said pivot arm including a pivot arm guide for guiding said cable member, and means for urging said pivot arm away from said retracted position toward said extended position to maintain tension in said cable member.

2. A take-up apparatus in accordance with claim 1 wherein said support arm and said pivot arm in the retracted position have a maximum cross-sectional size less than the size of said opening to permit insertion and removal of said support arm and said pivot arm from said space through said opening.

3. A take-up apparatus in accordance with claim 2 wherein said wall is the wall of a tire press dome and said space is a steam chamber within said dome, said opening is a hand hole in said dome, said supporting member is a hand hole cover for said hand hole and said cable member extends through said hand hole.

4. A take-up apparatus in accordance with claim 3 wherein said hand hole cover has a cable sealing gland for sealing engagement with said cable member.

5. A take-up apparatus in accordance with claim 4 wherein said pivot arm includes a clamp for clamping said cable member to said pivot arm.

6. A take-up apparatus in accordance with claim 5 wherein the length of said cable member in said steam chamber may be adjusted by releasing said cable member from said cable sealing gland and said clamp on said pivot arm, pulling said cable member through said opening and gripping said cable member in said cable sealing gland and clamp on said pivot arm.

7. A take-up apparatus in accordance with claim 3 wherein one end of said flexible cable member is fastened to a segment of a segmental mold which is movable horizontally and axially relative to said wall.

8. A take-up apparatus in accordance with claim 1 wherein said support arm is positioned in said space adjacent said wall and said pivot arm is mounted for swinging movement toward and away from said wall.

9. A take-up apparatus in accordance with claim 8 wherein said support arm is curved to position said support arm guide adjacent said wall.

10. A take-up apparatus in accordance with claim 1 wherein said means for urging said pivot arm away from said retracted position toward said extended position includes a torsion spring.

11. A take-up apparatus in accordance with claim 1 including a stop member mounted on said supporting member for limiting swinging movement of said pivot arm away from said retracted position to determine said extended position of said pivot arm.

12. A take-up apparatus in accordance with claim 1 including a clevis mounted on said supporting member having a clevis pin for pivotally supporting one end of said pivot arm.

13. A take-up apparatus in accordance with claim 7 wherein a probe for measuring the temperature of a tire during vulcanization is mounted on said segment and connected to said flexible cable member.

* * * * *